US008521392B2

(12) United States Patent
Aono

(10) Patent No.: US 8,521,392 B2
(45) Date of Patent: Aug. 27, 2013

(54) COMPUTER PROGRAM AND NUMERICAL CALCULATION APPARATUS

(75) Inventor: Toshihiro Aono, Abiko (JP)

(73) Assignee: Hitachi, Ltd., Tokyo (JP)

(*) Notice: Subject to any disclaimer, the term of this patent is extended or adjusted under 35 U.S.C. 154(b) by 215 days.

(21) Appl. No.: 13/191,662

(22) Filed: Jul. 27, 2011

(65) Prior Publication Data

US 2012/0029784 A1 Feb. 2, 2012

(30) Foreign Application Priority Data

Jul. 29, 2010 (JP) ................. 2010-171028

(51) Int. Cl.
*B60T 7/12* (2006.01)

(52) U.S. Cl.
USPC ............. 701/78; 701/74; 701/83; 701/104; 180/165; 180/197

(58) Field of Classification Search
USPC ............. 701/72, 74, 78, 83, 104; 708/443; 180/197, 164, 165; 380/287
See application file for complete search history.

(56) References Cited

U.S. PATENT DOCUMENTS

| 5,394,250 A * | 2/1995 | Shono ............. 358/3.03 |
| 5,790,442 A * | 8/1998 | Ninomiya et al. ..... 708/444 |
| 6,208,738 B1 * | 3/2001 | Goldenfeld et al. ..... 380/287 |

FOREIGN PATENT DOCUMENTS

JP 2008-197949 8/2008

OTHER PUBLICATIONS

John B. Heywood, SI Engine Fuel Metering and Manifold Phenomena, Internal Combustion Engine Fundamentals, 1988, pp. 304-309.

* cited by examiner

Primary Examiner — Gertrude Arthur Jeanglaude
(74) Attorney, Agent, or Firm — Antonelli, Terry, Stout & Kraus, LLP.

(57) ABSTRACT

In order to cause a computer to execute integral calculation of an integrand, to thereby calculate a value of a second variable used at each calculation time point, the integrand being defined by: a first variable to which a value is given at all calculation time points; and the second variable to which only an initial value is given, the following processing is executed. First, a partial derivative which is obtained by partially differentiating the integrand for the second variable is read out from a storage device. At each calculation time point, the initial value or a value of the second variable calculated at a last calculation time point and a value of the first variable given at a current calculation time point are substituted into each of the integrand and the partial derivative, to thereby calculate a value of the integrand and a value of the partial derivative at the current calculation time point. After this, a value of the second variable used at a next calculation time point is calculated by using an exponential function in which: the calculated value of the integrand is used as an initial value; and a value obtained by multiplying the value of the integrand by the value of the partial derivative is used as a gradient. Accordingly, it becomes possible to solve a differential equation of a distributed parameter system with a reduced amount of calculation.

15 Claims, 10 Drawing Sheets

Fig. 7

|  | v > V1 | V1>v>V2 | V2>v>V3 | V3>v>V4 | V4>v |
|---|---|---|---|---|---|
| Wheel speed v: decrease | $P_r \leftarrow P_r + \Delta P$<br>$V1 \leftarrow V$ | $P_r \leftarrow P_r + \Delta P$ | $P_r \leftarrow P_r$ | $P_r \leftarrow P_r - \Delta P$ | $P_r \leftarrow P_r$ |
| Wheel speed v: increase | $P_r \leftarrow P_r$ | $P_r \leftarrow P_r + \Delta P$ | $P_r \leftarrow P_r$ | $P_r \leftarrow P_r$ | $P_r \leftarrow P_r$ |

COMPUTER PROGRAM AND NUMERICAL CALCULATION APPARATUS

BACKGROUND OF THE INVENTION

1. Field of the Invention

The present invention relates to a numerical calculation technology which is used for obtaining an approximate solution of a differential equation.

2. Background Art

Fluid calculation is necessary for state estimation of an intake system and a hydraulic system of an internal combustion engine. At present, in the field of an arithmetic method for the fluid calculation, a large number of inventions relating to a method of solving a partial differential equation of a distributed parameter system have been made. For example, JP Patent Publication (Kokai) No. 2008-197949 A discloses a technique of enhancing calculation accuracy according to a local interpolation differential operator method. More specifically, JP Patent Publication (Kokai) No. 2008-197949 A discloses a technique of time-integrating a variable by applying semi-Lagrangian advection in which the Lagrangian method is applied to an advection term, to an advection term of a partial differential equation for an interpolation function regarding the variable to be time-integrated.

JP Patent Publication (Kokai) No. 2008-197949 A relates to a numerical calculation technique for stably solving a partial differential equation expressed in Expression (1).

[Expression 1]

$$\frac{\partial f}{\partial t} + \frac{\partial uf}{\partial x} = 0 \quad (1)$$

This differential equation is often used for calculation of a one-dimensional fluid. In this equation, f represents the density and u represents the speed. In order to stably solve Expression (1), the following two conditions are required.

(Condition 1) Smoothing of partial differential for obtaining $\partial uf/\partial x$ with excellent accuracy (Condition 2) Stabilization of integral of $-\partial uf/\partial x$ for a time point t for obtaining f with excellent accuracy The technique disclosed in JP Patent Publication (Kokai) No. 2008-197949 A relates to (Condition 1), and (Condition 2) has not been satisfied yet.

SUMMARY OF THE INVENTION

The inventor of the present invention focuses attention on a technique of realizing stable numerical calculation of an ordinary differential equation of a lumped parameter system expressed in Expression (2). In order to realize the stable numerical calculation of the ordinary differential equation of the lumped parameter system expressed in Expression (2), it is necessary to calculate with high accuracy Expression (3) obtained by expressing Expression (2) in the form of an integral equation.

[Expression 2]

$$\frac{dy}{dt} = f(x, y) \quad (2)$$

-continued $$y = \int f(x, y) dt \quad (3)$$

In view of the above, the inventor of the present invention has invented a numerical calculation technique which enables calculating the integral equation expressed in Expression (3) with high accuracy while suppressing an increase in load required for the numerical calculation. That is, with regard to the numerical calculation technique for executing integral calculation of an integrand for a time point, to thereby calculate a value of a second variable used at each calculation time point, the integrand being defined by: a first variable to which a value is given at all calculation time points; and the second variable to which only an initial value is given, the inventor of the present invention has invented a technique including:

(1) processing of reading out, from a storage device, a partial derivative which is obtained by partially differentiating the integrand for the second variable; and (2) at each calculation time point, (2-1) processing of substituting: one of the initial value and a value of the second variable calculated at a last calculation time point; and a value of the first variable given at a current calculation time point, into the integrand read out from the storage device, to thereby calculate a value of the integrand at the current calculation time point, and then storing the calculation result into the storage device;

(2-2) processing of substituting: one of the initial value and the value of the second variable calculated at the last calculation time point; and the value of the first variable given at the current calculation time point, into the partial derivative read out from the storage device, to thereby calculate a value of the partial derivative at the current calculation time point, and then storing the calculation result into the storage device;

(2-3) processing of storing, into the storage device, an exponential function in which: the calculated value of the integrand at the current calculation time point is used as an initial value; and a value obtained by multiplying the value of the integrand by the value of the partial derivative is used as a gradient; and (2-4) processing of calculating a value of the second variable used at a next calculation time point, on a basis of the exponential function read out from the storage device.

According to the present invention, it is possible to realize with high accuracy integral calculation for a time point, of an integrand which is defined by: a first variable to which a value is given at all calculation time points; and a second variable to which only an initial value is given, while suppressing an increase in load required for the numerical calculation.

BRIEF DESCRIPTION OF THE DRAWINGS

FIG. 7 is a table showing a control example of the hydraulic brake.

DETAILED DESCRIPTION OF THE PREFERRED EMBODIMENTS

Hereinafter, embodiments of the present invention are described with reference to the drawings. It should be noted that the contents of apparatus configurations and processing operations to be described later are given as an example for describing the invention. The present invention encompasses: an invention obtained by combining the apparatus configurations and the processing operations to be described later; an invention obtained by combining a known technology with the apparatus configurations and the processing operations to be described later; and an invention obtained by replacing part of the apparatus configurations and the processing operations to be described later with a known technology. In addition, the present invention can be applied to a case where a variable of a differential equation which satisfies Expression (2) is obtained by numerical calculation. In the following embodiments, the present invention is described by taking, as examples, air-fuel ratio control of an internal combustion engine (Embodiment 1) and control of a hydraulic brake (Embodiment 2).

Embodiment 1

Internal Combustion Engine and Control System Thereof

Figure 1:
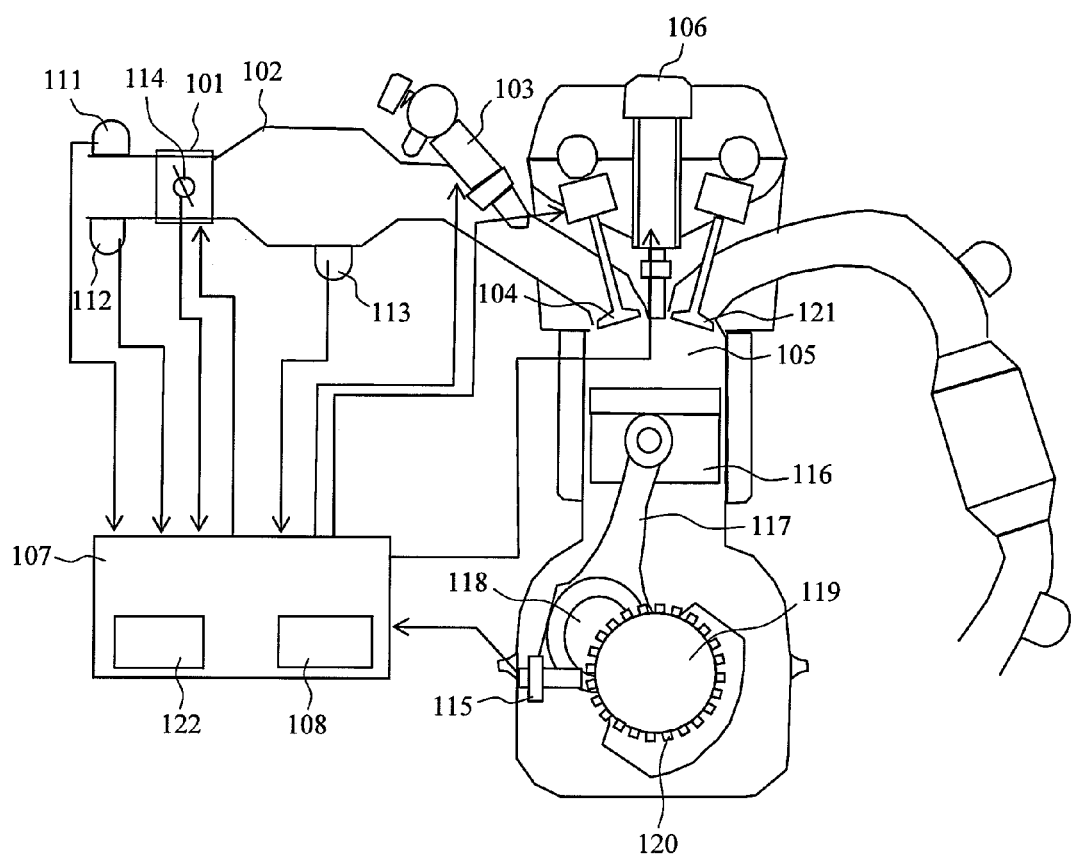
FIG. 1 is a view illustrating a schematic configuration example of an internal combustion engine and a control system thereof.

FIG. 1 illustrates a schematic configuration of an internal combustion engine and a control system thereof. The internal combustion engine performs intake, compression, combustion/expansion, and exhaust of a fuel in one cycle, and takes out, as a power, a push-down force of a piston 116 which is generated when the fuel is combusted inside of a cylinder 105. Here, the inflow of air containing the fuel into the cylinder 105 is controlled by an intake valve 104, and the exhaust of a combustion gas from the cylinder 105 is controlled by an exhaust valve 121. In addition, an up-and-down motion of the piston 116 inside of the cylinder 105 is converted into a rotary motion of a crankshaft 119 via a connecting rod 117 and a crankpin 118.

The air is guided to the cylinder 105 through a throttle valve 101 and an intake pipe 102. The length of the intake pipe 102 is adjusted to be suitable for an increase in flow rate of the air so that the intake pipe 102 can supply a larger amount of air to the cylinder 105. In the vicinity before the cylinder 105 inside of the intake pipe 102, a fuel injection device 103 injects the fuel with an amount substantially proportional to the amount of the air. The injected fuel is mixed with the air to be taken into the cylinder 105 as a mixture gas. At the timing at which the mixture gas containing the air and the fuel is compressed inside of the cylinder 105, an ignition device 106 causes ignition to combust the mixture gas. Energy associated with this combustion is transmitted to the crankshaft 119 as a power, so that the crankshaft 119 is rotary-driven. A ring gear 120 is coaxially attached to the crankshaft 119, and the rotation speed of the ring gear 120 is measured by an engine speed sensor 115.

Incidentally, the amount of the air supplied to the cylinder 105 is adjusted by the degree of an opening angle (throttle angle) of the throttle valve 101. The relation between a throttle angle θ of the throttle valve 101 and a pressure $P_m$ inside of the intake pipe 102 can be expressed by Expression (4), and the relation between an intake amount $M_c$ taken into the cylinder 105 and the intake pipe pressure $P_m$ can be expressed by Expression (5). These relations are described in "Internal Combustion Engine Fundamentals", John B. Heywood, Apr. 1, 1988 and the like.

[Expression 4]

$$\frac{dP_m}{dt} = \frac{RT_m}{V_m}\left\{C_D A_t(1-\cos\theta)\frac{P_0}{\sqrt{RT_0}}\sqrt{\frac{2\gamma}{\gamma-1}\left[\left(\frac{P_m}{P_0}\right)^{2/\gamma} - \left(\frac{P_m}{P_0}\right)^{(\gamma+1)/\gamma}\right]} - \frac{V_c N_{eng}\eta}{RT_m}P_m\right\} \quad (4)$$

[Expression 5]

$$M_c = \frac{P_m V_c N_{eng}}{RT_m}\eta \quad (5)$$

It should be noted that the respective symbols in the expressions represent the following values.

$P_m$: pressure of intake pipe
$T_m$: temperature of intake pipe
$V_m$: volume of intake pipe
$P_0$: atmospheric pressure
$T_0$: atmospheric temperature
$V_c$: cylinder volume
$N_{eng}$: engine speed
$C_d$: flow rate coefficient
$A_t$: cross-sectional area of throttle valve
R: gas constant
γ: specific heat ratio
η: intake efficiency The amount of the fuel to be injected in accordance with the intake amount $M_c$, that is, a fuel injection amount $M_f$ can be calculated by dividing the intake amount $M_c$ by a target air-fuel ratio $\lambda_c$. The present embodiment adopts a technique of reading out the target air-fuel ratio $\lambda_c$ from an air-fuel ratio map 108. The air-fuel ratio map 108 stores therein in advance a correspondence relation between: a combination of the intake pipe pressure $P_m$ and the engine speed $N_{eng}$; and the target air-fuel ratio $\lambda_c$.

The control of the internal combustion engine is executed by an engine control unit 107. In the case of the present embodiment, the engine control unit 107 is configured by a computer, and a control program thereof is stored in a ROM 122. Control of the fuel injection amount to be described later is executed as calculation processing based on this control program.

(Control of Fuel Injection Amount)

Figure 2:
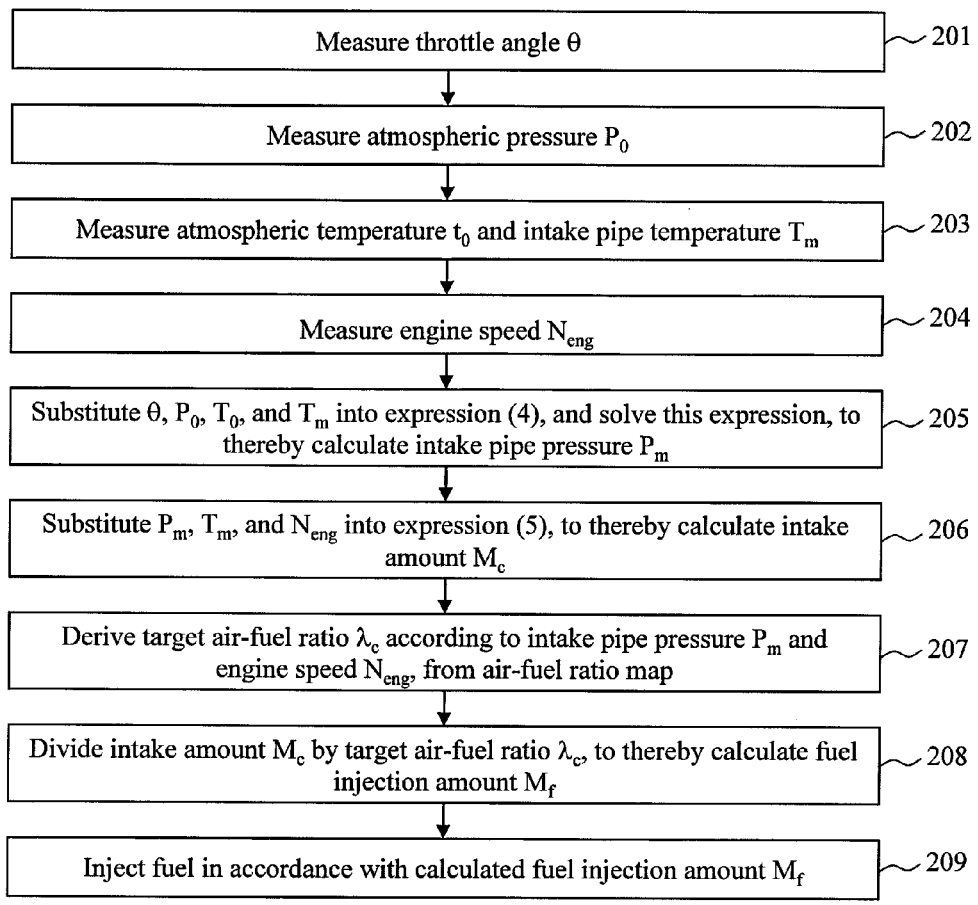
FIG. 2 is a flow chart for describing an outline of control of the internal combustion engine.

Hereinafter, description is given of a series of control procedures in which: the fuel injection amount $M_f$ to be supplied to the cylinder 105 is calculated on the basis of the opening degree of the throttle valve 101, the speed of the engine (internal combustion engine), and the state of the atmosphere which are given as measurement values; and injection control of the calculated fuel injection amount is actually performed. FIG. 2 shows an outline of the corresponding control procedures.

(Step 201)

In general, a throttle opening degree sensor 114 configured by, for example, a potentiometer is attached to the throttle valve 101. The throttle opening degree sensor 114 measures the throttle angle θ of the throttle valve 101, and gives the measured throttle angle θ to the engine control unit (ECU) 107. Hereinafter, the throttle angle θ is also referred to as "opening degree".

(Step 202)

In many cases, the pressure of the air which is taken in by the internal combustion engine from the atmosphere can be considered as 1 atmosphere. However, in the case of use at a high-altitude location such as a mountainous area, the pressure of the air taken in from the atmosphere becomes lower than 1 atmosphere. In consideration of such a case, the internal combustion engine is provided with an atmospheric pressure sensor 112. An atmospheric pressure measured by the atmospheric pressure sensor 112 is given to the engine control unit 107 as the measurement value $P_0$.

(Step 203)

An atmospheric temperature sensor 111 is provided upstream of the throttle valve 101 in the airflow path. On the other hand, an intake temperature sensor 113 is provided downstream (in FIG. 1, on the intake pipe 102 side) of the throttle valve 101 in the airflow path. Each of the temperature sensors is configured by, for example, a thermocouple. The atmospheric temperature sensor 111 measures the atmospheric temperature $T_0$, and the intake temperature sensor 113 measures the intake pipe temperature $T_m$. The engine control unit 107 takes in the measured atmospheric temperature $T_0$ and the measured intake pipe temperature $T_m$.

(Step 204)

The engine speed sensor 115 is provided at a position close to a gear wheel of the ring gear 120. Pulsations synchronized with the rotation speed of the ring gear 120 appear in an output of the engine speed sensor 115. The speed of the engine is measured by counting the number of such pulsations. This measurement value is taken into the engine control unit 107 as the engine speed $N_{eng}$.

(Step 205)

The engine control unit 107 substitutes the numerical values measured in the above-mentioned steps into Expression (4), to thereby calculate (predict) the intake pipe pressure $P_m$ at each calculation time point by numerical calculation. The numerical calculation here corresponds to a core part of the technique proposed by the inventor of the present invention, and the detail thereof will be described later. In addition, the engine control unit 107 which executes the numerical calculation here corresponds to an example of the "numerical calculation apparatus" in the section of "What is claimed is:".

(Step 206)

After calculating the intake pipe pressure $P_m$, the engine control unit 107 substitutes the calculated intake pipe pressure $P_m$, the measured intake pipe temperature $T_m$, and the measured engine speed $N_{eng}$ into Expression (5), to thereby calculate the intake amount $M_c$.

(Step 207)

The engine control unit 107 searches the air-fuel ratio map 108 for the target air-fuel ratio $\lambda_c$ corresponding to the combination of the intake pipe pressure $P_m$ and the engine speed $N_{eng}$, to thereby calculate the target air-fuel ratio $\lambda_c$ according to a current operation state.

(Step 208)

The engine control unit 107 divides the intake amount $M_c$ calculated in Step 206 by the target air-fuel ratio $\lambda_c$ read out in Step 207, to thereby calculate the fuel injection amount $M_f$.

(Step 209)

The engine control unit 107 controls a period of valve opening time of the fuel injection device 103 in accordance with the calculated fuel injection amount $M_f$ and controls the fuel injection amount $M_f$ to become a predetermined amount.

(Numerical Calculation Method for Intake Pipe Pressure $P_m$)

Hereinafter, description is given of the detailed procedure for the numerical calculation executed in Step 205. This processing refers to obtaining an approximate solution of Expression (4) by numerical calculation. According to a conventional technique, Expression (4) is transformed into a difference equation expressed in Expression (6), and the difference equation is recursively solved, whereby the intake pipe pressure $P_m$ is calculated.

[Expression 6]

$$P_m(t+1) = P_m(t) + \frac{RT_m}{V_m} \left\{ C_D A_t (1-\cos\theta) \frac{P_0}{\sqrt{RT_0}} \sqrt{\frac{2\gamma}{\gamma-1}\left[\left(\frac{P_m(t)}{P_0}\right)^{2/\gamma} - \left(\frac{P_m(t)}{P_0}\right)^{(\gamma+1)/\gamma}\right]} - \frac{V_c N_{eng} \eta}{RT_m} P_m(t) \right\} \Delta \quad (6)$$

However, according to the method of solving the difference equation, the calculation diverges unless a time step Δ is set significantly finely. Therefore, in the case of Step 205 according to the present embodiment, the numerical calculation is executed according to procedures shown in FIG. 3.

(Step 301)

Before the pressure value at each calculation time point is calculated, a partial derivative K ($P_m(t)$, $Q_m(t)$) is obtained in advance by partially differentiating an integrand (that is, the right-hand side of Expression (4)) F ($P_m(t)$, $Q_m(t)$) for the intake pipe pressure $P_m$. The integrand F ($P_m(t)$, $Q_m(t)$) is expressed in Expression (7), and the partial derivative K ($P_m(t)$, $Q_m(t)$) is expressed in Expression (8). It should be noted that $Q_m$ in each of the integrand F ($P_m(t)$, $Q_m(t)$) and the partial derivative K ($P_m(t)$, $Q_m(t)$) refers to measurement values of various sensors at each calculation time point. A definitional expression of $Q_m$ according to the present embodiment is expressed in Expression (9).

[Expression 7]

$$F(P_m, \theta, P_0, T_0, T_m, N_{eng}) = \frac{RT_m}{V_m} \left\{ C_D A_t (1-\cos\theta) \frac{P_0}{\sqrt{RT_0}} \sqrt{\frac{2\gamma}{\gamma-1}\left[\left(\frac{P_m}{P_0}\right)^{2/\gamma} - \left(\frac{P_m}{P_0}\right)^{(\gamma+1)/\gamma}\right]} - \frac{V_c N_{eng} \eta}{RT_m} P_m \right\} \quad (7)$$

[Expression 8]

$$K(P_m, Q_m) \equiv \frac{\partial F}{\partial P_m}(P_m) = \frac{RT_m}{V_m} \left\{ A_t C_d (1-\cos\theta) \sqrt{\frac{2k}{k-1}} \frac{1}{\sqrt{RT_a}} \frac{\frac{2}{k}\left(\frac{P_m}{P_a}\right)^{2/k-1} - \frac{k+1}{k}\left(\frac{P_m}{P_a}\right)^{1/k}}{2\sqrt{\left(\frac{P_m}{P_a}\right)^{2/k} - \left(\frac{P_m}{P_a}\right)^{1+1/k}}} - \frac{V_c N_{eng} \eta}{RT_m} \right\} \quad (8)$$

$$Q_m = (\theta, P_0, T_0, T_m, N_{eng}) \quad (9)$$

Here, in the integrand F ($P_m(t)$, $Q_m(t)$) expressed in Expression (7), the intake pipe pressure $P_m$ corresponds to the second variable in the section of "What is claimed is:", and the measurement value $Q_m(t)$ corresponds to the first variable in the section of "What is claimed is:".

Figure 3:
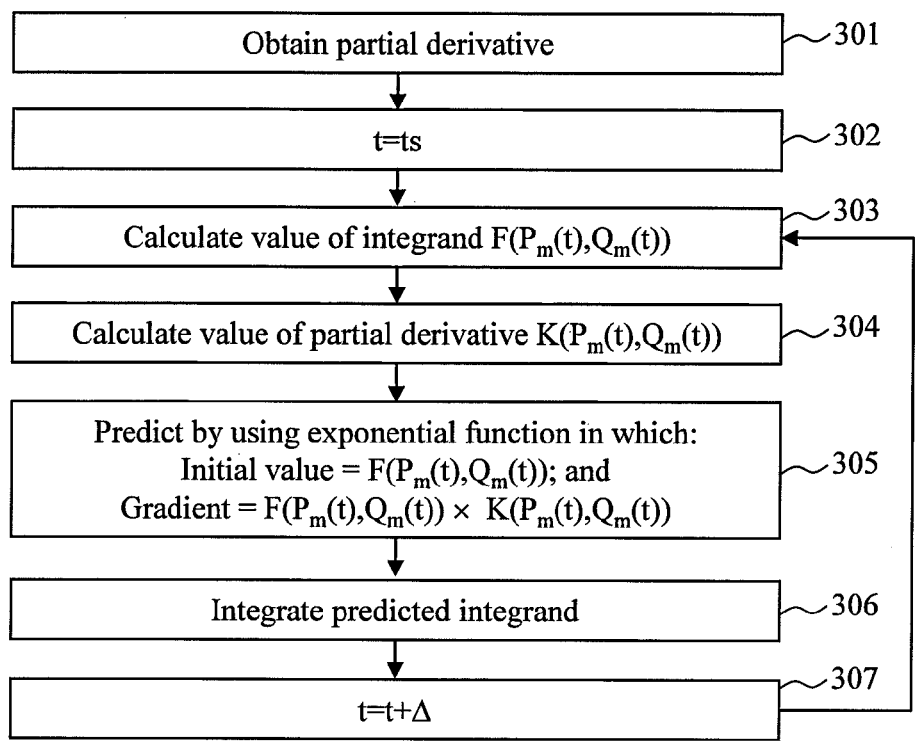
FIG. 3 is a flow chart for describing control processing of the internal combustion engine.

It should be noted that the calculation processing of the partial derivative K ($P_m(t)$, $Q_m(t)$) expressed in Expression (8) may be executed only once before start of the calculation processing of the intake pipe pressure $P_m$. FIG. 3 shows that the control program executes the calculation processing of the partial derivative as the first process of Step 205, but the calculation itself may be executed before Step 205. Preferably, the partial derivative K ($P_m(t)$, $Q_m(t)$) may be derived in advance according to such a method as formula manipulation to be stored into the ROM 122 which stores therein the control program.

(Step 302)

A time point t is set to a calculation start time point ts. From this time point, the calculation of the intake pipe pressure $P_m$ is started for each time step $\Delta$. At this time, an initial value of the intake pipe pressure $P_m$ is also read out from the ROM 122. In addition, at the start time point ts, measurement values $Q_m(ts)$ taken in from the various sensors are also read out from a storage region (RAM).

(Step 303)

First, the control program calculates a value of the integrand F ($P_m(t)$, $Q_m(t)$) at the time point t. This calculation is executed by substituting the initial value of the intake pipe pressure $P_m$ and the measurement values $Q_m$ of the various sensors into Expression (7). It should be noted that, at a calculation time point other than the first, a value of the intake pipe pressure $P_m$ calculated at a last calculation time point t−$\Delta$ and the measurement values $Q_m(t)$ taken in from the various sensors at the current calculation time point t are read out from the storage region (RAM).

(Step 304)

Similarly, the control program calculates a value of the partial derivative K ($P_m(t)$, $Q_m(t)$) at the time point t. This calculation is executed by substituting the initial value of the intake pipe pressure $P_m$ and the measurement values $Q_m$ of the various sensors into Expression (8). Also in this step, at a calculation time point other than the first, the value of the intake pipe pressure $P_m$ calculated at the last calculation time point t−$\Delta$ and the measurement values $Q_m(t)$ taken in from the various sensors at the current calculation time point t are read out from the storage region (RAM).

(Step 305)

Next, the control program uses the values calculated in Steps 303 and 304, to thereby predict the integrand F ($P_m(t)$, $Q_m(t)$) which can be applied from the current calculation time point t to a next calculation time point t+$\Delta$. Specifically, the integrand F ($P_m(t)$, $Q_m(t)$) is predicted as an exponential function in which the initial value and the gradient are defined as follows.

Initial value=$F(P_m(t), Q_m(t))$

Gradient=$F(P_m(t), Q_m(t)) * K(P_m(t), Q_m(t))$

Figure 4:
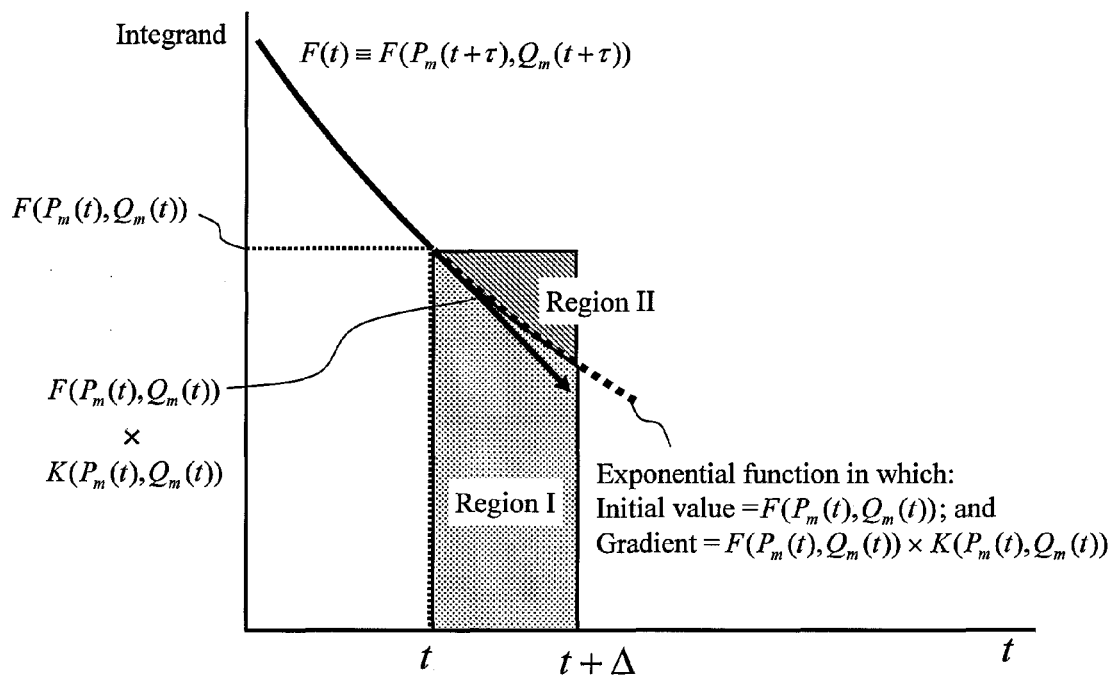
FIG. 4 is a graph for describing a concept of numerical calculation according to the present invention.

The predicted function (result) is given as a locus indicated by a dotted line in FIG. 4. It should be noted that an arrow in FIG. 4 indicates the calculated gradient. The predicted function F (t+τ) is expressed in Expression (10).

$$F(t+\tau) = F(P_m(t), Q_m(t)) e^{-K(P_m(t), Q_m(t))\tau} \quad (10)$$

After this, the control program stores the predicted function F (t+τ) into the storage region (RAM).

(Step 306)

Next, the control program reads out the predicted function F (t+τ) from the storage region, and then integrates the read-out function for a time zone [t, t+$\Delta$], to thereby calculate the integral value (an area of a region I in FIG. 4). After that, the control program adds the calculated integral value to the intake pipe pressure $P_m(t)$ at the current calculation time point t, to thereby calculate an intake pipe pressure $P_m(t+\Delta)$ at the next calculation time point t+$\Delta$. The predicted intake pipe pressure $P_m(t+\Delta)$ at the next calculation time point t+$\Delta$ is expressed in Expression (11).

[Expression 11]

$$P_m(t+\Delta) = P_m(t) + F(P_m(t), Q_m(t)) \frac{1 - e^{-K(P_m(t), Q_m(t))\Delta}}{K(P_m(t), Q_m(t))} \quad (11)$$

The calculated intake pipe pressure $P_m(t+\Delta)$ is stored into the storage region (RAM), and is read out in the next Step 206.

(Step 307)

The control program adds the time step $\Delta$ to the current calculation time point t, and updates the current time point on the calculation processing. After updating the current time point, the control program returns to Step 303, and repeats the calculation.

(Conclusion)

As has been described in the above, originally, the variable (intake pipe pressure $P_m$) expressed in the form of a differential equation (integrand) smoothly changes as indicated by a curve in FIG. 4. Then, the integral value for the time zone from the current calculation time point t to the next calculation time point t+$\Delta$ corresponds to obtaining the area of the region I in FIG. 4.

A conventional integral method corresponds to a method in which: an area of a rectangle which is formed by the height F ($P_m(t)$, $Q_m(t)$) of the integral zone top and the time step $\Delta$ in FIG. 4 is obtained; and the obtained area is added to the intake pipe pressure $P_m$ at the current calculation time point t. Therefore, according to the conventional integral method, a portion corresponding to a region II in FIG. 4 occurs as an error. It should be noted that, in order to reduce the error portion in the conventional integral method, it is effective to make the time step $\Delta$ smaller. However, as described above, making the time step $\Delta$ smaller leads to the problem that a load on the numerical calculation becomes significantly larger.

In contrast to this, in the case of the present embodiment, the transition in the zone of an integrand is predicted by an exponential function defined by the initial value and the gradient, and the predicted function is integrated from the current calculation time point t to the next calculation time point t+$\Delta$. This makes it possible to obtain only the area corresponding to the region I. As a result, even if the time step $\Delta$ is made larger, an error can be reduced, that is, the prediction accuracy of an integral value can be increased.

In other words, it becomes possible to stably numerically calculate the differential equation as expressed in Expression (2), more specifically, the differential equation as expressed in Expression (4), to which the variable having only its initial value given thereto and the numerical values at each calculation time point are given from the outside.

In the present embodiment, the numerical calculation method as described above is applied to the estimation of the intake pipe pressure $P_m$ in the internal combustion engine, whereby the estimation value of the intake pipe pressure $P_m$ becomes stable. In addition, the intake amount $M_c$ and the fuel injection amount $M_f$ which are numerically calculated on the basis of the intake pipe pressure $P_m$ thus estimated also become stable. That is, an effect that the air-fuel ratio control of the internal combustion engine becomes stable is realized.

Embodiment 2

(Hydraulic Pressure System of Brake and Control System Thereof)

Figure 5:
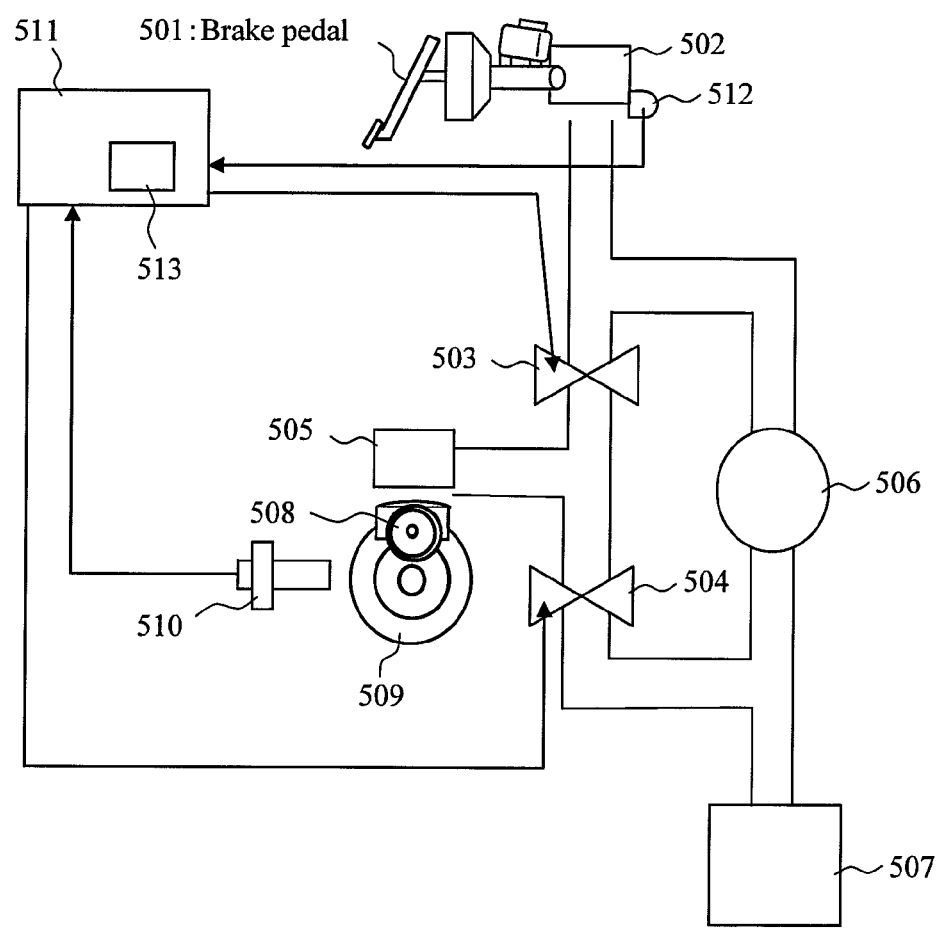
FIG. 5 is a view illustrating a schematic configuration example of a hydraulic brake and a control system thereof.

FIG. 5 illustrates a schematic configuration of a hydraulic pressure system of a brake and a control system thereof. The hydraulic pressure system of the brake includes a master cylinder 502, a wheel cylinder 505, a reservoir 507, a holding valve 503, a pressure reducing valve 504, and a pump 506.

The master cylinder 502 is means for converting an operation of a brake pedal 501 by a driver into a hydraulic pressure. The wheel cylinder 505 is means for converting the hydraulic pressure into a brake force. The reservoir 507 is means for storing therein hydraulic oil. The holding valve 503 is located on a piping path of the hydraulic oil which connects the master cylinder 502 and the wheel cylinder 505 to each other, and is means for controlling opening/closing of the flow of the hydraulic oil in this zone. The pressure reducing valve 504 is located on a piping path of the hydraulic oil which connects the wheel cylinder 505 and the reservoir 507 to each other, and is means for controlling opening/closing of the flow of the hydraulic oil in this zone. The pump 506 is located on a piping path of the hydraulic oil which connects the reservoir 507 and the master cylinder 502 to each other, and is means used for returning the hydraulic oil from the reservoir 507 to the master cylinder 502.

The control system of the hydraulic pressure system includes a wheel speed sensor 510, a master cylinder pressure sensor 512, and a hydraulic control unit 511.

When the driver presses the brake pedal 501, the hydraulic pressure inside of the master cylinder 502 increases. This increase in hydraulic pressure is transmitted to the wheel cylinder 505 via the holding valve 503 which is controlled to be opened. Along with this increase in internal pressure of the wheel cylinder 505, a brake pad 508 is pushed against a wheel 509. In an ABS (anti-lock braking system), in order to prevent a lock of the wheel 509, a wheel speed V is measured by the wheel speed sensor 510, and the opening degrees of the holding valve 503 and the pressure reducing valve 504 are controlled. That is, the working level of the brake is controlled by adjusting the opening degrees thereof.

The control of the hydraulic pressure is executed by the hydraulic control unit 511. The hydraulic control unit 511 uses, as input conditions, the pressure measured by the master cylinder pressure sensor 512, the speed of the wheel 509 measured by the wheel speed sensor 510, the opening degree of the holding valve, and the opening degree of the pressure reducing valve, and controls the pressure of the wheel cylinder 505 on the basis of these values. Specifically, the opening degrees of the holding valve 503 and the pressure reducing valve 504 are controlled. In the case of the present embodiment, the hydraulic control unit 511 is configured by a computer, and a control program thereof is stored in a ROM 513. Control of the hydraulic pressure of the wheel cylinder to be described later is executed as calculation processing based on this control program.

(Control of Hydraulic Brake)

Figure 6:
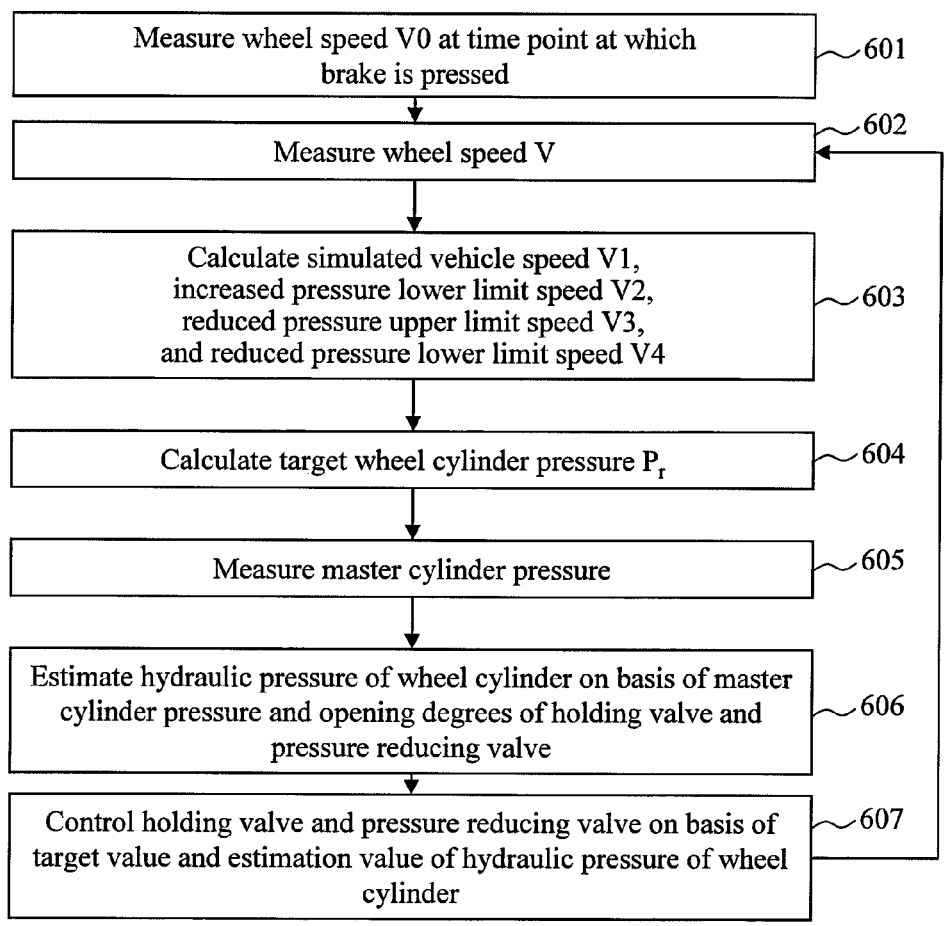
FIG. 6 is a flow chart for describing control processing of the hydraulic brake.

Hereinafter, description is given of a series of control procedures in which: the wheel cylinder pressure is calculated on the basis of the master cylinder pressure, the opening degree of the holding valve, and the opening degree of the pressure reducing valve which are given as measurement values; and the hydraulic pressure is controlled so that the calculated wheel cylinder pressure is realized. FIG. 6 shows an outline of the corresponding control procedures.

(Step 601)

The hydraulic control unit 511 detects that the brake pedal 501 is pressed, on the basis of a hydraulic pressure signal inputted from the master cylinder pressure sensor 512. The control program which has detected that the brake pedal 501 is pressed measures a wheel speed V0 at that moment by means of a speed signal inputted from the wheel speed sensor 510, and stores the measured wheel speed V0 into the storage region (RAM) (not shown).

(Step 602)

The hydraulic control unit 511 measures a wheel speed V for each control cycle on the basis of the speed signal inputted from the wheel speed sensor 510, and stores the measured wheel speed V into the storage region (RAM) (not shown).

(Step 603)

The hydraulic control unit 511 calculates the following four types of reference speeds V1, V2, V3, and V4 necessary for the control, on the basis of: an elapsed time t from the time point at which the brake pedal 501 is pressed; and the initial speed V0 of the wheel 509.

Simulated vehicle speed $V1 = V0 - \alpha \times t$ (i)

Increased pressure lower limit speed $V2 = V0 - \alpha \times t - U2$ (ii)

Reduced pressure upper limit speed $V3 = V0 - \alpha \times t - U3$ (iii)

Reduced pressure lower limit speed $V4 = V0 - \alpha \times t - U4$ (iv)

where $\alpha$, U2, U3, and U4 are values which are set in advance according to experiment results and the like, and are stored in the ROM 513 or the like of the hydraulic control unit 511. It is assumed that U2<U3<U4. In this case, the relation of V1>V2>V3>V4 is established among the four types of reference speeds.

(Step 604)

The hydraulic control unit 511 executes: processing of comparing a high/low relation between the four types of calculated reference speeds (V1, V2, V3, and V4) and the wheel speed V measured by the wheel speed sensor 510; processing of determining whether the wheel speed V is increasing or decreasing (increase/decrease direction); and processing of controlling a target wheel cylinder pressure $P_r$ on the basis of the comparison result and the determination result. FIG. 7 shows control contents of the target wheel cylinder pressure $P_r$ which is associated with a combination of: the comparison result between the respective reference speeds and the wheel speed; and the increase/decrease direction of the wheel speed.

For example, when a series of changes in the wheel speed V exhibits a decrease in speed and the wheel speed V is larger than the simulated vehicle speed V1, the hydraulic control unit 511 performs such control that the target wheel cylinder pressure $P_r$ increases by a unit change pressure $\Delta P$. That is, the hydraulic pressure is increased for a further decrease in speed. It should be noted that, only in this case, as shown in the table of FIG. 7, the wheel speed V is controlled to be the simulated vehicle speed V1. At the time of a decrease in speed, when "V1>V>V2", the target wheel cylinder pressure $P_r$ is increased by the unit change pressure $\Delta P$. When "V2>V>V3", the target wheel cylinder pressure $P_r$ is held at the current value. When "V3>V>V4", the target wheel cylinder pressure $P_r$ is reduced by the unit change pressure $\Delta P$. Further, when "V4>V", the target wheel cylinder pressure $P_r$ is held at the current value. On the other hand, at the time of an increase in speed, only when "V1>V>V2", the target wheel cylinder pressure $P_r$ is increased by the unit change pressure ΔP, and in other cases, the target wheel cylinder pressure $P_r$ is held at the current value basically.

Figure 8:
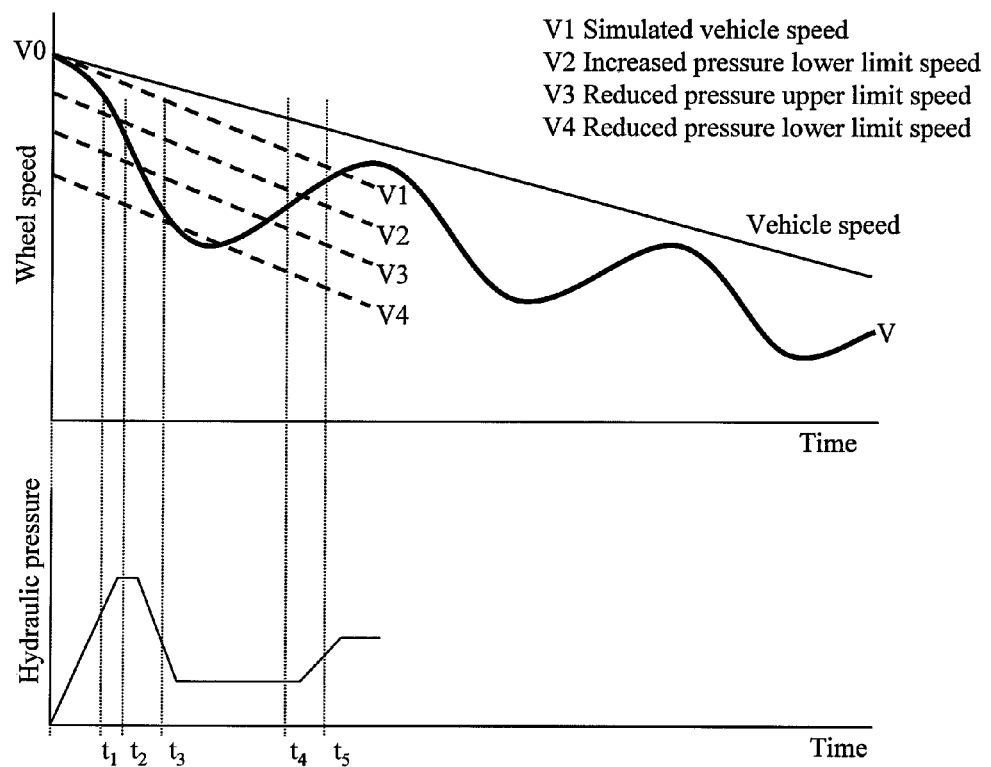
FIG. 8 is a graph for describing a relation between control of the hydraulic brake and a determination speed.

The calculation of the target wheel cylinder pressure $P_r$ is the main point of the brake control, and thus is specifically described with reference to FIG. 8. The upper part of FIG. 8 shows a change in vehicle speed when the hydraulic pressure is controlled so as to follow the target wheel cylinder pressure $P_r$. The lower part of FIG. 8 shows a change in wheel cylinder pressure.

In FIG. 8, at the initial speed V0, the brake pedal 501 starts to be pressed. When the brake pedal 501 starts to be pressed, the hydraulic pressure inside of the wheel cylinder 505 is increased in order to make higher the working level of the brake. Accordingly, the vehicle speed starts to decrease, and the wheel speed V becomes smaller than the simulated vehicle speed V1.

Between the time points t1 and t2, when the wheel speed V becomes smaller than the increased pressure lower limit speed V2, the hydraulic control unit 511 stops the increase in the target wheel cylinder pressure $P_r$, and holds a value immediately before the stop. Even if the hydraulic pressure is maintained, the working level of the brake does not change, and hence the vehicle speed gradually decreases.

Between the time points t2 and t3, when the wheel speed V becomes smaller than the reduced pressure upper limit speed V3, the hydraulic control unit 511 reduces the target wheel cylinder pressure $P_r$ in order to make lower the working level of the brake.

Between the time points t3 and t4, when the wheel speed V becomes smaller than the reduced pressure lower limit speed V4, the hydraulic control unit 511 determines that the speed has excessively decreased. As a result, the hydraulic control unit 511 holds the target wheel cylinder pressure $P_r$ at a value immediately before the determination so that the speed is recovered while the working level of the brake is maintained. This control is continued until the wheel speed V exceeds the increased pressure lower limit speed V2.

Between the time points t4 and t5, when the wheel speed V exceeds the increased pressure lower limit speed V2, the hydraulic control unit 511 increases the target wheel cylinder pressure $P_r$ in order to make higher the working level of the brake again.

After the time point t5, the control of making higher the working level of the brake is continued by the hydraulic control unit 511 until the wheel speed V exceeds the simulated vehicle speed V1. After a while, when the wheel speed V exceeds the simulated vehicle speed V1, the hydraulic control unit 511 holds the target wheel cylinder pressure $P_r$ in order to maintain the working level of the brake.

As shown in FIG. 8, the target wheel cylinder pressure $P_r$ is increased and reduced within a given range, whereby the wheel cylinder pressure can be controlled within a range within which tires do not slip on a road surface. In FIG. 7, the rule of such control as described above which is repeatedly executed is organized into a table. The control operations in Step 604 can be brought together in the table of FIG. 7

(Step 605)

The hydraulic control unit 511 stores the master cylinder pressure $P_m$ measured by the master cylinder pressure sensor 512 into the storage region (RAM) (not shown) or the like.

(Step 606)

The hydraulic control unit 511 substitutes the measurement value of the master cylinder pressure $P_m$, an opening degree $A_m$ of the holding valve 503, and an opening degree $A_r$ of the pressure reducing valve 504 into Expression (12), to thereby calculate a wheel cylinder pressure $P_{wc}$ at the next calculation time point by numerical calculation.

[Expression 12]

$$\frac{dP_{wc}}{dt} = \left\{ A_m C_m \text{sgn}(P_{wc} - P_m) \sqrt{\frac{2|P_{wc} - P_m|}{\rho}} - A_r C_r \text{sgn}(P_{wc} - P_r) \sqrt{\frac{2|P_{wc} - P_r|}{\rho}} \right\} \quad (12)$$

The numerical calculation here corresponds to a core part of the technique proposed by the inventor of the present invention, and the detail thereof will be described later. In addition, the hydraulic control unit 511 which executes the numerical calculation here corresponds to an example of the "numerical calculation apparatus" in the section of "What is claimed is:".

(Step 607)

Figure 9:
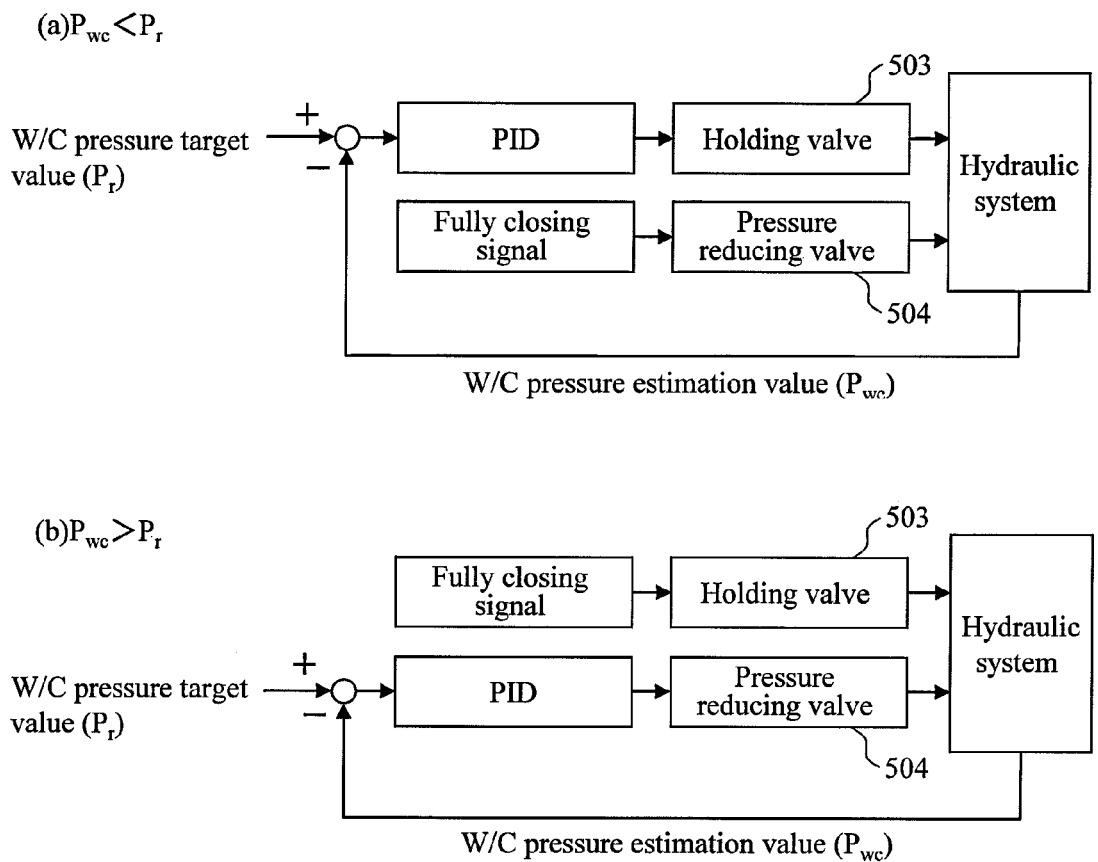
FIG. 9 is a diagram for describing a control example of a valve associated with the control of the hydraulic brake.

The hydraulic control unit 511 compares the wheel cylinder pressure $P_{wc}$ (estimation value) calculated in Step 606 and the target wheel cylinder pressure $P_r$ with each other, to thereby control the opening degrees of the holding valve 503 and the pressure reducing valve 504. In the control on the opening degrees of the holding valve 503 and the pressure reducing valve 504, the closed state is switched in accordance with the magnitude relation between the wheel cylinder pressure $P_{wc}$ calculated by the numerical calculation and the target wheel cylinder pressure $P_r$. FIG. 9 illustrates a control example of the opening degrees according to the magnitude relation between the estimation value and the target value.

(a) In the Case Where $P_r > P_{wc}$

As illustrated in part (a) of FIG. 9, the hydraulic control unit 511 PID-controls the holding valve 503 with the pressure reducing valve 504 being kept fully closed. That is, the opening degree of the holding valve 503 is feedback-controlled.

(b) In the Case Where $P_r < P_{wc}$

As illustrated in part (b) of FIG. 9, the hydraulic control unit 511 PID-controls the pressure reducing valve 504 with the holding valve 503 being kept fully closed. That is, the opening degree of the pressure reducing valve 504 is feedback-controlled.

When the next control cycle (calculation time point) comes, the hydraulic control unit 511 returns to Step 602, and repeatedly executes the series of processing operations.

(Numerical Calculation Method for Wheel Cylinder Pressure $P_{wc}$)

Hereinafter, description is given of the detailed procedure for the numerical calculation executed in Step 606. This processing refers to obtaining an approximate solution of Expression (12) by numerical calculation. According to a conventional technique, Expression (12) is transformed into a difference equation expressed in Expression (13), and the difference equation is recursively solved, whereby the wheel cylinder pressure $P_{wc}$ is calculated.

[Expression 13]

$$P_{wc}(t + \Delta) = P_{wc}(t) + \left\{ A_m C_m \text{sgn}(P_{wc} - P_m) \sqrt{\frac{2|P_{wc} - P_m|}{\rho}} - A_r C_r \text{sgn}(P_{wc} - P_r) \sqrt{\frac{2|P_{wc} - P_r|}{\rho}} \right\} \Delta \quad (13)$$

However, according to the method of solving the difference equation, the calculation diverges unless the time step Δ is set significantly finely. Therefore, in the case of Step 606 according to the present embodiment, the numerical calculation is executed according to procedures shown in FIG. 10.

(Step 1001)

Before the pressure value at each calculation time point is calculated, a partial derivative h ($P_{wc}$(t), $Q_m$(t)) is obtained in advance by partially differentiating an integrand (that is, the right-hand side of Expression (12)) g ($P_{wc}$(t), $Q_m$(t)) expressed in Expression (14) for the wheel cylinder pressure $P_{wc}$. The partial derivative h ($P_{wc}$(t), $Q_m$(t)) is expressed in Expression (15). It should be noted that $Q_m$ in each of the integrand g ($P_{wc}$(t), $Q_m$(t)) and the partial derivative h ($P_{wc}$(t), $Q_m$(t)) refers to measurement values of various sensors at each calculation time point. A definitional expression of $Q_m$ according to the present embodiment is expressed in Expression (16).

[Expression 14]

$$g(P_{wc}(t), Q_m(t)) = \left\{ A_m C_m \text{sgn}(P_{wc} - P_m) \sqrt{\frac{2|P_{wc} - P_m|}{\rho}} - A_r C_r \text{sgn}(P_{wc} - P_r) \sqrt{\frac{2|P_{wc} - P_r|}{\rho}} \right\} \quad (14)$$

[Expression 15]

$$h(P_{wc}, Q_m(t)) \equiv \frac{\partial g}{\partial P_{wc}}(P_{wc}(t), Q_m(t)) = \left\{ A_m C_m \sqrt{\frac{1}{\rho|P_{wc} - P_m|}} - A_r C_r \sqrt{\frac{1}{\rho|P_m - P_r|}} \right\} \quad (15)$$

$$Q_m = (A_m, A_r, P_m) \quad (16)$$

Here, in the integrand g ($P_{wc}$(t), $Q_m$(t)) expressed in Expression (14), the wheel cylinder pressure $P_{wc}$ corresponds to the second variable in the section of "What is claimed is:", and the measurement value $Q_m$(t) corresponds to the first variable in the section of "What is claimed is:".

Figure 10:
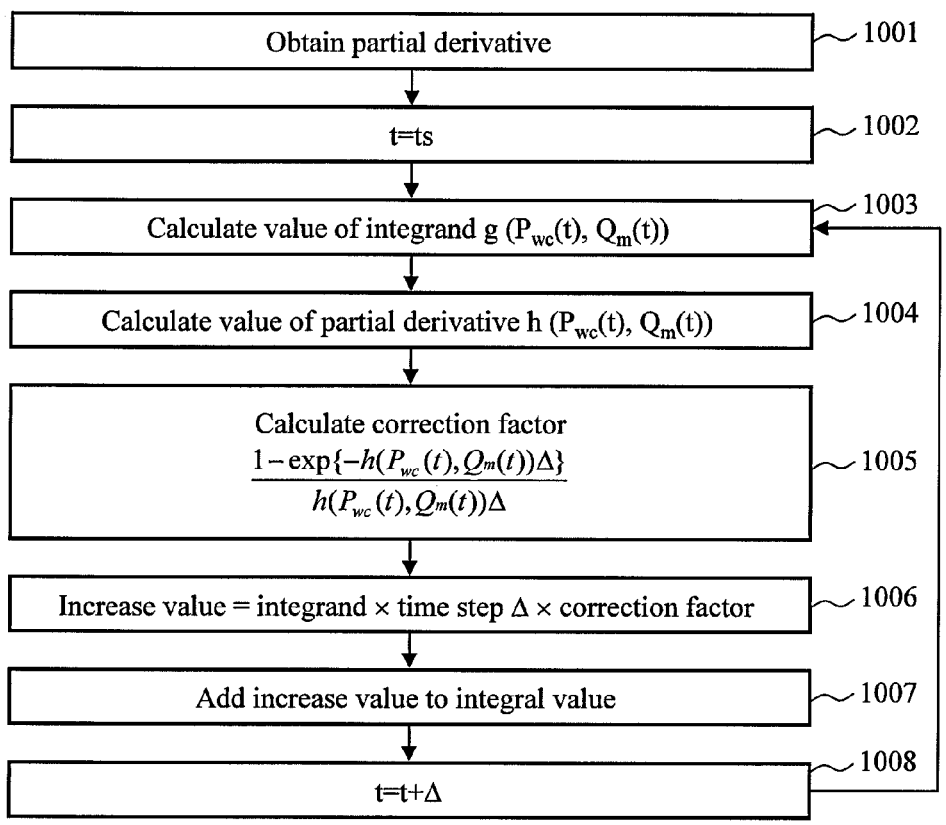
FIG. 10 is a flow chart for describing a concept of the numerical calculation according to the present invention.

It should be noted that the calculation processing of the partial derivative h ($P_{wc}$(t), $Q_m$(t)) expressed in Expression (15) may be executed only once before start of the calculation processing of the wheel cylinder pressure $P_{wc}$. FIG. 10 shows that the control program executes the calculation processing of the partial derivative as the first process of Step 1001, but the calculation itself may be executed before Step 1001. Preferably, the partial derivative h ($P_{wc}$(t), $Q_m$(t)) may be derived in advance according to such a method as formula manipulation to be stored into the ROM 513 which stores therein the control program.

(Step 1002)

The time point t is set to the calculation start time point ts. From this time point, the calculation of the wheel cylinder pressure $P_{wc}$ is started for each time step Δ. At this time, an initial value of the wheel cylinder pressure $P_{wc}$ is also read out from the ROM 513. In addition, at the start time point ts, the measurement values $Q_m$(ts) taken in from the various sensors are also read out from the storage region (RAM).

(Step 1003)

First, the control program calculates a value of the integrand g ($P_{wc}$(t), $Q_m$(t)) at the time point t. This calculation is executed by substituting the initial value of the wheel cylinder pressure $P_{wc}$ and the measurement values $Q_m$ of the various sensors into Expression (14). It should be noted that, at a calculation time point other than the first, a value of the wheel cylinder pressure $P_{wc}$ calculated at the last calculation time point t−Δ and the measurement values $Q_m$(t) taken in from the various sensors at the current calculation time point t are read out from the storage region (RAM).

(Step 1004)

Similarly, the control program calculates a value of the partial derivative h ($P_{wc}$(t), $Q_m$(t)) at the time point t. This calculation is executed by substituting the initial value of the wheel cylinder pressure $P_{wc}$ and the measurement values $Q_m$ of the various sensors into Expression (15). Also in this step, at a calculation time point other than the first, the wheel cylinder pressure $P_{wc}$ calculated at the last calculation time point t−Δ and the measurement values $Q_m$(t) taken in from the various sensors at the current calculation time point t are read out from the storage region (RAM).

(Step 1005)

Next, the control program uses the values calculated in Steps 1003 and 1004, to thereby predict a correction factor which can be applied in the time zone from the current calculation time point t to the next calculation time point t+Δ. The correction factor refers to a factor which is used for correcting an integral value calculated when a conventional difference equation is adopted. Specifically, the correction factor is defined as a ratio of: an area (the region I in FIG. 4) to be truly obtained; to an area (the region I+the region II in FIG. 4) which is obtained by multiplying a value of the integrand g ($P_{wc}$(t), $Q_m$(t)) at the current calculation time point t by the time step Δ. Here, the area to be truly obtained (the area of the region I in FIG. 4) is given by the second term in the right-hand side of Expression (11). Accordingly, the correction factor is calculated as expressed in Expression (17).

[Expression 17]

$$\frac{1 - \exp\{-h(P_{wc}(t), Q_m(t))\Delta\}}{h(P_{wc}(t), Q_m(t))\Delta} \quad (17)$$

After this, the control program stores the calculated correction factor into the storage region (RAM).

(Step 1006)

The control program multiplies the value of the integrand g ($P_{wc}$(t), $Q_m$(t)) at the current calculation time point t by the time step Δ and the correction factor calculated in Step 1005, to thereby calculate an increase value of the area in the time zone from the current calculation time point t to the next calculation time point t+Δ.

(Step 1007)

Next, the control program adds the increase value calculated in Step 1006 to a wheel cylinder pressure $P_{wc}$(t) at the current calculation time point t, to thereby calculate a wheel cylinder pressure $P_{wc}$(t+Δ) at the next calculation time point t+Δ. The calculation expression thereof is expressed in Expression (18).

[Expression 18]

$$P_{wc}(t + \Delta) = P_{wc}(t) + g(P_{wc}(t), Q_m(t)) \frac{1 - e^{-h(P_{wc}(t),Q_m(t))\Delta}}{h(P_{wc}(t), Q_m(t)))} \quad (18)$$

The calculated wheel cylinder pressure $P_{wc}$(t+Δ) is stored into the storage region (RAM), and is read out in the next Step 607.

15

(Step 1007)

The control program adds the time step $\Delta$ to the current calculation time point t, and updates the current time point on the calculation processing. After updating the current time point, the control program returns to Step 1003, and repeats the calculation.

(Conclusion)

As has been described in the above, because the numerical calculation using the correction factor is executed, Embodiment 2 is different from Embodiment 1 in the numerical calculation of which the integrand is predicted and integrated. However, only apparent calculation techniques are different therebetween, and hence these calculations can be regarded as equivalent to each other in terms of the expressions. Accordingly, also in the case of Embodiment 2, it is possible to stably numerically calculate the differential equation as expressed in Expression (2), more specifically, the differential equation as expressed in Expression (12). As a result, the estimation of the wheel cylinder pressure of the brake hydraulic system becomes stable, so that the brake control based on this pressure becomes stable.

Other Embodiments

In the case of the above-mentioned embodiments, the numerical calculation using the integral as described in Embodiment 1 is applied to the calculation of the intake pipe pressure, but the numerical calculation using the integral can also be applied to the calculation of the wheel cylinder pressure. In this case, the wheel cylinder pressure may be used as a variable to which only its initial value is given, and the master cylinder pressure, the opening degree of the holding valve, and the opening degree of the pressure reducing valve may be used as variables to which measurement values are given at all calculation time points.

Similarly, in the case of the above-mentioned embodiments, the numerical calculation using the correction factor as described in Embodiment 2 is applied to the calculation of the wheel cylinder pressure, but the numerical calculation using the correction factor can also be applied to the calculation of the intake pipe pressure. In this case, the intake pipe pressure may be used as a variable to which only its initial value is given, and the opening degree of the throttle valve of the internal combustion engine, the speed of the internal combustion engine, and the state of the atmosphere may be used as variables to which measurement values are given at all calculation time points.

In addition, in the above-mentioned embodiments, description is given of the case where the numerical calculation according to the present invention is applied to the control of the internal combustion engine and the hydraulic brake, but the numerical calculation according to the present invention can be adopted in an arbitrary field as long as requirements for the numerical calculation are satisfied. As a matter of course, measurement values do not necessarily need to be used for the variables constituting the differential equations to which the numerical calculation according to the present invention is applied.

DESCRIPTION OF SYMBOLS

| | |
|---|---|
| 101: | throttle valve |
| 102: | intake pipe |
| 103: | fuel injection device |
| 104: | intake valve |

16

DESCRIPTION OF SYMBOLS -continued

| | |
|---|---|
| 105: | cylinder |
| 106: | ignition device |
| 107: | engine control unit (ECU) |
| 108: | air-fuel ratio map |
| 111: | atmospheric temperature sensor |
| 112: | atmospheric pressure sensor |
| 113: | intake temperature sensor |
| 114: | throttle opening degree sensor |
| 115: | engine speed sensor |
| 116: | piston |
| 117: | connecting rod |
| 118: | crankpin |
| 119: | crankshaft |
| 120: | ring gear |
| 121: | exhaust valve |
| 122: | ROM |
| 501: | brake pedal |
| 502: | master cylinder |
| 503: | holding valve |
| 504: | pressure reducing valve |
| 505: | wheel cylinder |
| 506: | pump |
| 507: | reservoir |
| 508: | brake pad |
| 509: | wheel |
| 510: | wheel speed sensor |
| 511: | hydraulic control unit |
| 512: | master cylinder pressure sensor |
| 513: | ROM |

What is claimed is:

1. A computer program for an internal combustion engine, which causes a computer to execute integral calculation of an integrand for a time point, to thereby calculate a value of a second variable used at each calculation time point, the integrand being defined by: a first variable to which a value is given at all calculation time points; and the second variable to which only an initial value is given, the computer program comprising:

processing of reading out, from a storage device, a partial derivative which is obtained by partially differentiating the integrand for the second variable; and at each calculation time point, processing of substituting: one of the initial value and a value of the second variable calculated at a last calculation time point; and a value of the first variable given at a current calculation time point, into the integrand read out from the storage device, to thereby calculate a value of the integrand at the current calculation time point, and then storing the calculation result into the storage device;

processing of substituting: one of the initial value and the value of the second variable calculated at the last calculation time point; and the value of the first variable given at the current calculation time point, into the partial derivative read out from the storage device, to thereby calculate a value of the partial derivative at the current calculation time point, and then storing the calculation result into the storage device;

processing of storing, into the storage device, an exponential function in which: the calculated value of the integrand at the current calculation time point is used as an initial value; and a value obtained by multiplying the value of the integrand by the value of the partial derivative is used as a gradient; and processing of calculating a value of the second variable used at a next calculation time point, on a basis of the exponential function read out from the storage device, wherein:

the processing of calculating a value of the second variable used at a next calculation time point, on a basis of the exponential function read out from the storage device, includes:
    processing of integrating the exponential function from the current calculation time point to the next calculation time point, and then storing the calculated integral value into the storage device; and
    processing of adding the integral value read out from the storage device to a value of the second variable at the current calculation time point, to thereby calculate the value of the second variable used at the next calculation time point, and then storing the calculation value into the storage device;
the first variable includes variables which represent an opening degree of a throttle valve, an engine speed, and a state of atmosphere; and
the second variable is a pressure of an intake pipe.

2. A computer program for an internal combustion engine, which causes a computer to execute integral calculation of an integrand for a time point, to thereby calculate a value of a second variable used at each calculation time point, the integrand being defined by: a first variable to which a value is given at all calculation time points; and the second variable to which only an initial value is given, the computer program comprising:
    processing of reading out, from a storage device, a partial derivative which is obtained by partially differentiating the integrand for the second variable; and
    at each calculation time point,
    processing of substituting: one of the initial value and a value of the second variable calculated at a last calculation time point; and a value of the first variable given at a current calculation time point, into the integrand read out from the storage device, to thereby calculate a value of the integrand at the current calculation time point, and then storing the calculation result into the storage device;
    processing of substituting: one of the initial value and the value of the second variable calculated at the last calculation time point; and the value of the first variable given at the current calculation time point, into the partial derivative read out from the storage device, to thereby calculate a value of the partial derivative at the current calculation time point, and then storing the calculation result into the storage device;
    processing of storing, into the storage device, an exponential function in which: the calculated value of the integrand at the current calculation time point is used as an initial value; and a value obtained by multiplying the value of the integrand by the value of the partial derivative is used as a gradient; and
    processing of calculating a value of the second variable used at a next calculation time point, on a basis of the exponential function read out from the storage device, wherein:
the processing of calculating a value of the second variable used at a next calculation time point, on a basis of the exponential function read out from the storage device, includes:
    processing of integrating the exponential function from the current calculation time point to the next calculation time point, and then storing the calculated integral value into the storage device;
    processing of calculating a correction factor on a basis of the integral value read out from the storage device, and then storing the calculated correction factor into the storage device;
    processing of reading out, from the storage device, the calculated value of the integrand at the current calculation time point, multiplying the read-out value of the integrand by the correction factor and a period of time from the current calculation time point to the next calculation time point, to thereby calculate an increase value, and then storing the calculated increase value into the storage device; and
    processing of adding the increase value read out from the storage device to a value of the second variable at the current calculation time point, to thereby calculate the value of the second variable used at the next calculation time point, and then storing the calculation value into the storage device;
the first variable includes variables which represent an opening degree of a throttle valve, an engine speed, and a state of atmosphere; and
the second variable is a pressure of an intake pipe.

3. The computer program for the internal combustion engine according to claim 1, further causing the computer to execute:
    processing of calculating an intake amount into a cylinder at the next calculation time point, on a basis of the pressure of the intake pipe calculated at each calculation time point, and then storing the calculation result into the storage device; and
    processing of controlling a fuel injection amount on a basis of the intake amount into the cylinder at the next calculation time point, the intake amount being read out from the storage device.

4. The computer program for the internal combustion engine according to claim 2, further causing the computer to execute:
    processing of calculating an intake amount into a cylinder at the next calculation time point, on a basis of the pressure of the intake pipe calculated at each calculation time point, and then storing the calculation result into the storage device; and
    processing of controlling a fuel injection amount on a basis of the intake amount into the cylinder at the next calculation time point, the intake amount being read out from the storage device.

5. A computer program for a hydraulic brake system, which causes a computer to execute integral calculation of an integrand for a time point, to thereby calculate a value of a second variable used at each calculation time point, the integrand being defined by: a first variable to which a value is given at all calculation time points; and the second variable to which only an initial value is given, the computer program comprising:
    processing of reading out, from a storage device, a partial derivative which is obtained by partially differentiating the integrand for the second variable; and
    at each calculation time point,
    processing of substituting: one of the initial value and a value of the second variable calculated at a last calculation time point; and a value of the first variable given at a current calculation time point, into the integrand read out from the storage device, to thereby calculate a value of the integrand at the current calculation time point, and then storing the calculation result into the storage device;

processing of substituting: one of the initial value and the value of the second variable calculated at the last calculation time point; and the value of the first variable given at the current calculation time point, into the partial derivative read out from the storage device, to thereby calculate a value of the partial derivative at the current calculation time point, and then storing the calculation result into the storage device;

processing of storing, into the storage device, an exponential function in which: the calculated value of the integrand at the current calculation time point is used as an initial value; and a value obtained by multiplying the value of the integrand by the value of the partial derivative is used as a gradient; and processing of calculating a value of the second variable used at a next calculation time point, on a basis of the exponential function read out from the storage device, wherein:

the processing of calculating a value of the second variable used at a next calculation time point, on a basis of the exponential function read out from the storage device, includes:

processing of integrating the exponential function from the current calculation time point to the next calculation time point, and then storing the calculated integral value into the storage device; and processing of adding the integral value read out from the storage device to a value of the second variable at the current calculation time point, to thereby calculate the value of the second variable used at the next calculation time point, and then storing the calculation value into the storage device;

the first variable includes variables which represent a hydraulic pressure of a master cylinder, an opening degree of a holding valve, and an opening degree of a pressure reducing valve; and the second variable is a hydraulic pressure of a wheel cylinder.

6. A computer program for a hydraulic brake system, which causes a computer to execute integral calculation of an integrand for a time point, to thereby calculate a value of a second variable used at each calculation time point, the integrand being defined by: a first variable to which a value is given at all calculation time points; and the second variable to which only an initial value is given, the computer program comprising:

processing of reading out, from a storage device, a partial derivative which is obtained by partially differentiating the integrand for the second variable; and at each calculation time point, processing of substituting: one of the initial value and a value of the second variable calculated at a last calculation time point; and a value of the first variable given at a current calculation time point, into the integrand read out from the storage device, to thereby calculate a value of the integrand at the current calculation time point, and then storing the calculation result into the storage device;

processing of substituting: one of the initial value and the value of the second variable calculated at the last calculation time point; and the value of the first variable given at the current calculation time point, into the partial derivative read out from the storage device, to thereby calculate a value of the partial derivative at the current calculation time point, and then storing the calculation result into the storage device;

processing of storing, into the storage device, an exponential function in which: the calculated value of the integrand at the current calculation time point is used as an initial value; and a value obtained by multiplying the value of the integrand by the value of the partial derivative is used as a gradient; and processing of calculating a value of the second variable used at a next calculation time point, on a basis of the exponential function read out from the storage device, wherein:

the processing of calculating a value of the second variable used at a next calculation time point, on a basis of the exponential function read out from the storage device, includes:

processing of integrating the exponential function from the current calculation time point to the next calculation time point, and then storing the calculated integral value into the storage device;

processing of calculating a correction factor on a basis of the integral value read out from the storage device, and then storing the calculated correction factor into the storage device;

processing of reading out, from the storage device, the calculated value of the integrand at the current calculation time point, multiplying the read-out value of the integrand by the correction factor and a period of time from the current calculation time point to the next calculation time point, to thereby calculate an increase value, and then storing the calculated increase value into the storage device; and processing of adding the increase value read out from the storage device to a value of the second variable at the current calculation time point, to thereby calculate the value of the second variable used at the next calculation time point, and then storing the calculation value into the storage device;

the first variable includes variables which represent a hydraulic pressure of a master cylinder, an opening degree of a holding valve, and an opening degree of a pressure reducing valve; and the second variable is a hydraulic pressure of a wheel cylinder.

7. The computer program for the hydraulic brake system according to claim 5, further causing the computer to execute processing of controlling the opening degree of the holding valve and the opening degree of the pressure reducing valve at the next calculation time point, on a basis of the hydraulic pressure of the master cylinder calculated at each calculation time point.

8. The computer program for the hydraulic brake system according to claim 6, further causing the computer to execute processing of controlling the opening degree of the holding valve and the opening degree of the pressure reducing valve at the next calculation time point, on a basis of the hydraulic pressure of the master cylinder calculated at each calculation time point.

9. A computer program, which causes a computer to execute integral calculation of an integrand for a time point, to thereby calculate a value of a second variable used at each calculation time point, the integrand being defined by: a first variable to which a value is given at all calculation time points; and the second variable to which only an initial value is given, the computer program causing the computer to execute:

processing of reading out, from a storage device, a partial derivative which is obtained by partially differentiating the integrand for the second variable; and at each calculation time point, processing of substituting: one of the initial value and a value of the second variable calculated at a last calculation time point; and a value of the first variable given at a current calculation time point, into the integrand read out from the storage device, to thereby calculate a value of the integrand at the current calculation time point, and then storing the calculation result into the storage device;

processing of substituting: one of the initial value and the value of the second variable calculated at the last calculation time point; and the value of the first variable given at the current calculation time point, into the partial derivative read out from the storage device, to thereby calculate a value of the partial derivative at the current calculation time point, and then storing the calculation result into the storage device;

processing of storing, into the storage device, an exponential function in which: the calculated value of the integrand at the current calculation time point is used as an initial value; and a value obtained by multiplying the value of the integrand by the value of the partial derivative is used as a gradient; and processing of calculating a value of the second variable used at a next calculation time point, on a basis of the exponential function read out from the storage device.

10. The computer program according to claim 9, wherein the processing of calculating a value of the second variable used at a next calculation time point, on a basis of the exponential function read out from the storage device, includes:

processing of integrating the exponential function from the current calculation time point to the next calculation time point, and then storing the calculated integral value into the storage device; and processing of adding the integral value read out from the storage device to a value of the second variable at the current calculation time point, to thereby calculate the value of the second variable used at the next calculation time point, and then storing the calculation value into the storage device.

11. The computer program according to claim 9, wherein the processing of calculating a value of the second variable used at a next calculation time point, on a basis of the exponential function read out from the storage device, includes:

processing of integrating the exponential function from the current calculation time point to the next calculation time point, and then storing the calculated integral value into the storage device;

processing of calculating a correction factor on a basis of the integral value read out from the storage device, and then storing the calculated correction factor into the storage device;

processing of reading out, from the storage device, the calculated value of the integrand at the current calculation time point, multiplying the read-out value of the integrand by the correction factor and a period of time from the current calculation time point to the next calculation time point, to thereby calculate an increase value, and then storing the calculated increase value into the storage device; and processing of adding the increase value read out from the storage device to a value of the second variable at the current calculation time point, to thereby calculate the value of the second variable used at the next calculation time point, and then storing the calculation value into the storage device.

12. A numerical calculation apparatus for an internal combustion engine, comprising:

a storage device; and an arithmetic device which executes integral calculation of an integrand for a time point, to thereby calculate a value of a second variable used at each calculation time point, the integrand being defined by: a first variable to which a value is given at all calculation time points; and the second variable to which only an initial value is given, the numerical calculation apparatus being configured to:

execute processing of reading out, from the storage device, a partial derivative which is obtained by partially differentiating the integrand for the second variable; and cause the arithmetic device to execute, at each calculation time point;

processing of substituting: one of the initial value and a value of the second variable calculated at a last calculation time point; and a value of the first variable given at a current calculation time point, into the integrand read out from the storage device, to thereby calculate a value of the integrand at the current calculation time point, and then storing the calculation result into the storage device;

processing of substituting: one of the initial value and the value of the second variable calculated at the last calculation time point; and the value of the first variable given at the current calculation time point, into the partial derivative read out from the storage device, to thereby calculate a value of the partial derivative at the current calculation time point, and then storing the calculation result into the storage device;

processing of storing, into the storage device, an exponential function in which: the calculated value of the integrand at the current calculation time point is used as an initial value; and a value obtained by multiplying the value of the integrand by the value of the partial derivative is used as a gradient; and processing of calculating a value of the second variable used at a next calculation time point, on a basis of the exponential function read out from the storage device, wherein:

the processing of calculating a value of the second variable used at a next calculation time point, on a basis of the exponential function read out from the storage device, includes:

processing of integrating the exponential function from the current calculation time point to the next calculation time point, and then storing the calculated integral value into the storage device; and processing of adding the integral value read out from the storage device to a value of the second variable at the current calculation time point, to thereby calculate the value of the second variable used at the next calculation time point, and then storing the calculation value into the storage device;

the first variable includes variables which represent an opening degree of a throttle valve, an engine speed, and a state of atmosphere; and the second variable is a pressure of an intake pipe.

13. A numerical calculation apparatus for an internal combustion engine, comprising:

a storage device; and an arithmetic device which executes integral calculation of an integrand for a time point, to thereby calculate a value of a second variable used at each calculation time point, the integrand being defined by: a first variable to which a value is given at all calculation time points; and the second variable to which only an initial value is given, the numerical calculation apparatus being configured to:

execute processing of reading out, from the storage device, a partial derivative which is obtained by partially differentiating the integrand for the second variable; and cause the arithmetic device to execute, at each calculation time point;

processing of substituting: one of the initial value and a value of the second variable calculated at a last calculation time point; and a value of the first variable given at a current calculation time point, into the integrand read out from the storage device, to thereby calculate a value of the integrand at the current calculation time point, and then storing the calculation result into the storage device;

processing of substituting: one of the initial value and the value of the second variable calculated at the last calculation time point; and the value of the first variable given at the current calculation time point, into the partial derivative read out from the storage device, to thereby calculate a value of the partial derivative at the current calculation time point, and then storing the calculation result into the storage device;

processing of storing, into the storage device, an exponential function in which: the calculated value of the integrand at the current calculation time point is used as an initial value; and a value obtained by multiplying the value of the integrand by the value of the partial derivative is used as a gradient; and processing of calculating a value of the second variable used at a next calculation time point, on a basis of the exponential function read out from the storage device, wherein:

the processing of calculating a value of the second variable used at a next calculation time point, on a basis of the exponential function read out from the storage device, includes:

processing of integrating the exponential function from the current calculation time point to the next calculation time point, and then storing the calculated integral value into the storage device;

processing of calculating a correction factor on a basis of the integral value read out from the storage device, and then storing the calculated correction factor into the storage device;

processing of reading out, from the storage device, the calculated value of the integrand at the current calculation time point, multiplying the read-out value of the integrand by the correction factor and a period of time from the current calculation time point to the next calculation time point, to thereby calculate an increase value, and then storing the calculated increase value into the storage device; and processing of adding the increase value read out from the storage device to a value of the second variable at the current calculation time point, to thereby calculate the value of the second variable used at the next calculation time point, and then storing the calculation value into the storage device;

the first variable includes variables which represent an opening degree of a throttle valve, an engine speed, and a state of atmosphere; and the second variable is a pressure of an intake pipe.

14. A numerical calculation apparatus for a hydraulic brake system, comprising:

a storage device; and an arithmetic device which executes integral calculation of an integrand for a time point, to thereby calculate a value of a second variable used at each calculation time point, the integrand being defined by: a first variable to which a value is given at all calculation time points; and the second variable to which only an initial value is given, the numerical calculation apparatus being configured to:

execute processing of reading out, from the storage device, a partial derivative which is obtained by partially differentiating the integrand for the second variable; and cause the arithmetic device to execute, at each calculation time point;

processing of substituting: one of the initial value and a value of the second variable calculated at a last calculation time point; and a value of the first variable given at a current calculation time point, into the integrand read out from the storage device, to thereby calculate a value of the integrand at the current calculation time point, and then storing the calculation result into the storage device;

processing of substituting: one of the initial value and the value of the second variable calculated at the last calculation time point; and the value of the first variable given at the current calculation time point, into the partial derivative read out from the storage device, to thereby calculate a value of the partial derivative at the current calculation time point, and then storing the calculation result into the storage device;

processing of storing, into the storage device, an exponential function in which: the calculated value of the integrand at the current calculation time point is used as an initial value; and a value obtained by multiplying the value of the integrand by the value of the partial derivative is used as a gradient; and processing of calculating a value of the second variable used at a next calculation time point, on a basis of the exponential function read out from the storage device, wherein:

the processing of calculating a value of the second variable used at a next calculation time point, on a basis of the exponential function read out from the storage device, includes:

processing of integrating the exponential function from the current calculation time point to the next calculation time point, and then storing the calculated integral value into the storage device; and processing of adding the integral value read out from the storage device to a value of the second variable at the current calculation time point, to thereby calculate the value of the second variable used at the next calculation time point, and then storing the calculation value into the storage device;

the first variable includes variables which represent a hydraulic pressure of a master cylinder, an opening degree of a holding valve, and an opening degree of a pressure reducing valve; and the second variable is a hydraulic pressure of a wheel cylinder.

15. A numerical calculation apparatus for a hydraulic brake system, comprising:

a storage device; and an arithmetic device which executes integral calculation of an integrand for a time point, to thereby calculate a value of a second variable used at each calculation time point, the integrand being defined by: a first variable to which a value is given at all calculation time points; and the second variable to which only an initial value is given, the numerical calculation apparatus being configured to:

execute processing of reading out, from the storage device, a partial derivative which is obtained by partially differentiating the integrand for the second variable; and cause the arithmetic device to execute, at each calculation time point;

processing of substituting: one of the initial value and a value of the second variable calculated at a last calculation time point; and a value of the first variable given at a current calculation time point, into the integrand read out from the storage device, to thereby calculate a value of the integrand at the current calculation time point, and then storing the calculation result into the storage device;

processing of substituting: one of the initial value and the value of the second variable calculated at the last calculation time point; and the value of the first variable given at the current calculation time point, into the partial derivative read out from the storage device, to thereby calculate a value of the partial derivative at the current calculation time point, and then storing the calculation result into the storage device;

processing of storing, into the storage device, an exponential function in which: the calculated value of the integrand at the current calculation time point is used as an initial value; and a value obtained by multiplying the value of the integrand by the value of the partial derivative is used as a gradient; and processing of calculating a value of the second variable used at a next calculation time point, on a basis of the exponential function read out from the storage device, wherein:

the processing of calculating a value of the second variable used at a next calculation time point, on a basis of the exponential function read out from the storage device, includes:

processing of integrating the exponential function from the current calculation time point to the next calculation time point, and then storing the calculated integral value into the storage device;

processing of calculating a correction factor on a basis of the integral value read out from the storage device, and then storing the calculated correction factor into the storage device;

processing of reading out, from the storage device, the calculated value of the integrand at the current calculation time point, multiplying the read-out value of the integrand by the correction factor and a period of time from the current calculation time point to the next calculation time point, to thereby calculate an increase value, and then storing the calculated increase value into the storage device; and processing of adding the increase value read out from the storage device to a value of the second variable at the current calculation time point, to thereby calculate the value of the second variable used at the next calculation time point, and then storing the calculation value into the storage device;

the first variable includes variables which represent a hydraulic pressure of a master cylinder, an opening degree of a holding valve, and an opening degree of a pressure reducing valve in the hydraulic brake system; and the second variable is a hydraulic pressure of a wheel cylinder.

\* \* \* \* \*